United States Patent [19]

Riester et al.

[11] 3,910,652

[45] Oct. 7, 1975

[54] SELF-DIMENSIONING BEARING ASSEMBLY

[75] Inventors: William C. Riester, Williamsville; Bronislaus S. Graczyk, Snyder, both of N.Y.

[73] Assignee: Trico Products Corporation, Buffalo, N.Y.

[22] Filed: Mar. 29, 1974

[21] Appl. No.: 455,971

[52] U.S. Cl. .................................. 308/26; 308/72
[51] Int. Cl.² ...................................... F16C 13/00
[58] Field of Search ............... 308/9, 26, 72, 73, 29, 308/36.1, 140, 194, 238

[56] References Cited
UNITED STATES PATENTS

| | | | |
|---|---|---|---|
| 3,298,754 | 1/1967 | Riester | 308/72 |
| 3,322,475 | 5/1967 | Schick | 308/238 X |
| 3,476,447 | 11/1969 | Boyd | 308/72 X |
| 3,515,445 | 6/1970 | Stone | 308/26 X |
| 3,583,778 | 6/1971 | Mori | 308/172 |

Primary Examiner—M. Henson Wood, Jr.
Assistant Examiner—Gene A. Church
Attorney, Agent, or Firm—E. Herbert Liss

[57] ABSTRACT

A molded plastic pivot body is formed with an integrally molded sleeve bearing for journaling a pivot shaft of a windshield wiper system for a motor vehicle. The bearing includes concentric, radially spaced sleeves interconnected by webs disposed in the annular spaces between the sleeves. The inner sleeve is slotted axially, the slots being circumferentially spaced from each other. The annular spaces between adjacent webs form grease retainers and the slots serve as shaft lubricator as well as dirt collector grooves. The thickness of the outer sleeve wall is of a value which permits the outer sleeve to yield. The bearing is arranged on the pivot body support bracket unconfined so that the outer sleeve is free to flex. The segments formed by the slots in the inner sleeve are resilient and flexible. Radial forces applied to effect flexing of the segments is transmitted through the webs to the outer sleeve causing it to yield. A shaft of larger dimension than the inner diameter of the inner sleeve may be accommodated.

6 Claims, 6 Drawing Figures

U.S. Patent  Oct. 7, 1975  3,910,652
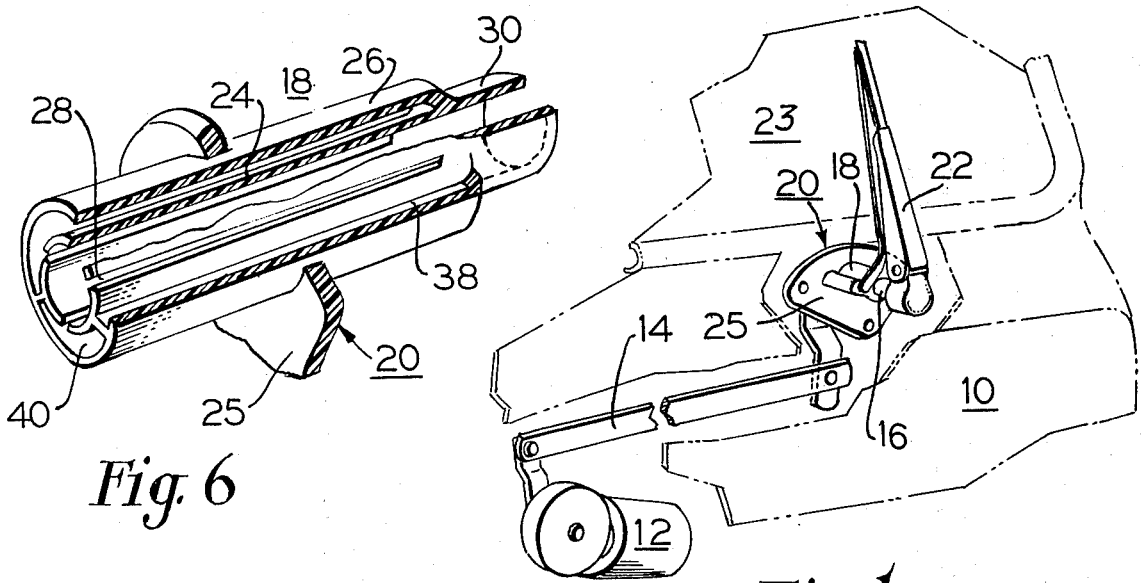
Fig. 6
Fig. 1
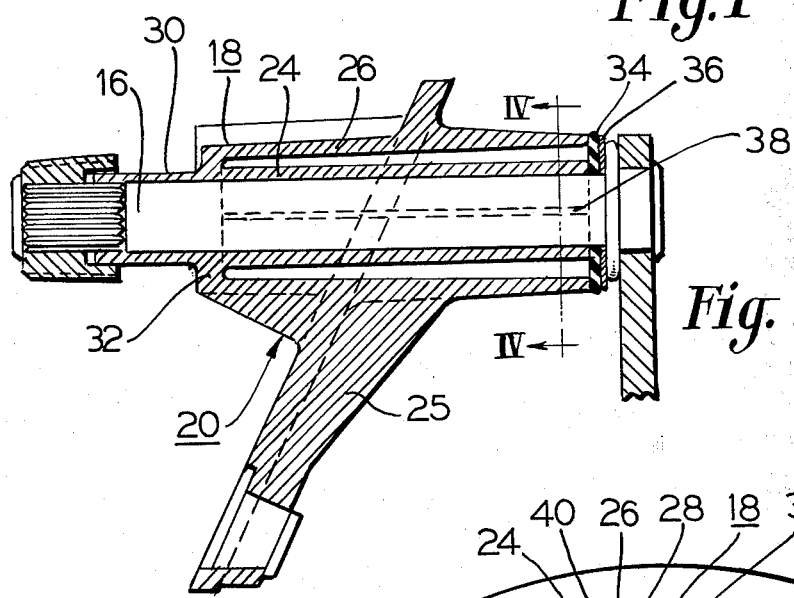
Fig. 2
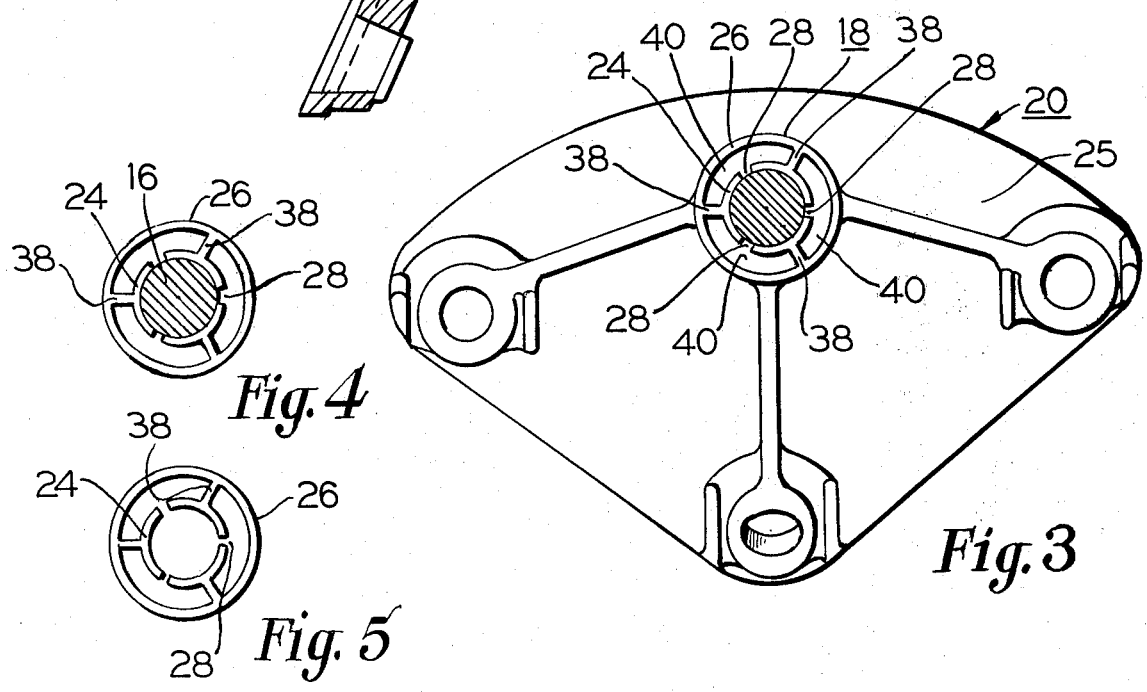
Fig. 4
Fig. 5
Fig. 3

SELF-DIMENSIONING BEARING ASSEMBLY

BACKGROUND OF THE INVENTION

The present invention relates to a sleeve bearing for a windshield wiper pivot shaft and more particularly to a self-dimensioning sleeve bearing which is flexible and resilient to accomodate a shaft of greater diameter than the inner diameter of the bearing.

Plastic molded sleeve bearings are known in the prior art which include lubricating grooves and grease lubricant pockets disposed circumferentially around the bearing in communication with the lubricating grooves. An example of such a bearing is illustrated in U.S. Pat. No. 3,583,778 issued June 8, 1971 by H. Mori. Self-aligning sleeve bearings are also described in the prior art wherein a bearing at each end of a shaft is flexibly mounted to achieve good alignment. Such a bearing is shown and described in U.S. Pat. No. 3,018,146 issued Jan. 23, 1963 by G. E. Euwe et al. However, neither of these prior art bearings are self-dimensioning.

In manufacturing a relatively long bearing, particularly one which is of molded plastic construction, it is extremely difficult to avoid some warpage, shrinkage and dimensional variations. In certain applications it is not economically feasible to maintain extremely precise tolerances. Thus, there occur, during manufacturing, clearance variations along the length of the bearing as well as variations in roundness and diameter along the length of the shaft. These variations may result in noisy operation and poor wear characteristics. It is, therefore, advantageous that an elongated sleeve bearing to accomodate an elongated shaft, as for example an oscillating pivot shaft for a motor vehicle windshield wiper system, be designed to accomodate the inherent variations which occur during manufacturing and the variations which occur due to wear. Further, in windshield wiper systems, at reversal the momentum of the wiper blade and arm coupled with the momentum of the crank arm which drives the pivot shaft effects a side thrust on the bearing which can result in excessive wear unless the bearing is suitably designed to absorb such thrust.

SUMMARY OF THE INVENTION

The present invention comprises a plastic molded bearing formed integrally with a pivot body or bearing housing wherein the bearing comprises radially spaced apart concentric sleeves interconnected by radial webs disposed in the annular space between the sleeves. The inner sleeve includes circumferentially spaced, axially extending slots forming resilient flexible segments for journaling the shaft. The bearing and shaft are so dimensioned as to result in interference fit. The outer sleeve is supported on a mounting bracket but is not constrained. Its wall is yieldable and resilient. The outer sleeve yields when the segments of the inner sleeve flex to accomodate the shaft and to adjust themselves to accomodate variations in the roundness and the diameter of the shaft and the bearing, warpage and wear. As the bearing and shaft wear during use the segments maintain a close and accurate fit due to flexibility of the segments and the outer sleeve. This flexibility also serves to absorb side thrust which occurs due to shock load which occurs during reversal of an oscillating shaft carrying a substantial load such as a wiper arm and blade. An ancillary advantage of this novel construction lies in the resultant grease pockets or retainers which are formed by the annular spaces between adjacent webs connecting the inner and outer sleeves. Further, the axial slots serve as lubricating slots and also serve as slots to collect foreign particules produced by wear or from external sources.

The principal object of the present invention is to provide an improved bearing construction which can accomodate variations in dimensions along the length of the bearing and the shaft journaled therein.

Another object of the invention is to provide an improved bearing construction which can readily absorb and yield to shock loads thereby reducing excessive bearing wear and increasing bearing life.

Yet another object of the invention is to provide an improved bearing construction which is self-dimensioning to compensate for bearing wear and shaft wear in which lubricant pockets and lubricating, dirt collecting grooves are provided.

Other objects and advantages of the invention will be apparent from the following detailed description taken in connection with the accompanying drawings.

BRIEF DESCRIPTION OF THE DRAWINGS

FIG. 1 is a fragmentary perspective view of the motor vehicle incorporating the invention;

FIG. 2 is a longitudinal cross section view of the bearing with the shaft inserted;

FIG. 3 is a bottom elevational view of the bearing;

FIG. 4 is a cross section taken on line IV—IV of FIG. 2;

FIG. 5 is a view similar to FIG. 4 with the shaft removed; and

FIG. 6 is a perspective view of the bearing partly broken away.

DETAILED DESCRIPTION OF THE INVENTION

Referring to FIG. 1 there is shown a fragment of a motor vehicle 10 with a section of the body metal broken away to show a portion of the windshield wiper system including a wiper motor 12, and transmission linkage 14 for oscillating the pivot shaft 16 journaled in bearing 18 of a pivot body 20. Secured to the outer end of the pivot shaft is a wiper arm 22 which carries a wiper blade (not shown) to and fro across the windshield 23. Referring now to FIGS. 2 through 6, a pivot body 20 of molded plastic material includes an integrally formed bearing 18 comprising an outer sleeve 26 and a segmented inner sleeve 24 concentric therewith and radially spaced therefrom. The inner sleeve 24 includes circumferentially spaced elongated slots 28 extending for substantially the entire length of the inner sleeve 24. The bearing 18 is supported in a mounting bracket 25 which provides support means for mounting the bearing unconstrained over substantially its entire length.

A portion 30 of the inner sleeve 24 extends at one end beyond outer sleeve 26 for a minor portion of its length. The annular space between the inner and outer sleeves is closed at one end by a wall 32. The annular space at the other end may be closed by a washer 34 which may be of foam rubber, as shown, or other suitable or desirable materials. The washer 34 may be reinforced by a back-up washer 36 which may be of steel or other suitable rigid material. The inner and outer sleeves 24 and 26 respectively are interconnected by radial webs 38 extending from wall 32 to the end of the bearing remote therefrom. The webs 38 are preferably disposed medially between adjacent slots 28. The annular spaces between adjacent webs 28 form lubricant pockets or retainers 40 which can be filled with grease or other suitable lubricants. The slots 28 constitute lubricant distributing and dirt collecting grooves. It can be seen that with this construction the segments of the inner sleeve 24 defined by the grooves 28 are resiliently flexible. The wall thickness of the outer sleeve 26 is dimensioned so that it, too, is yieldable and resilient. Thus radial forces applied to the segments of the inner sleeve 24 which effect flexing thereof are transmitted to the outer sleeve 26 causing it to yield.

The shaft 16 may be journalled in the inner sleeve. The inner sleeve 24 and shaft 16 are dimensioned to provide an interference fit. Because of the resiliency and flexibility of the segments and the outer sleeve 26, the bearing yields to accomodate the shaft 16 in running fit relationship and also to compensate for variances in the shaft diameter and the roundness of the shaft as well as variances in the diameter of the sleeve 24 and warpage resulting from the molding process. FIGS. 4 and 5 illustrate the expansion of the inner sleeve 24 and the yielding of the outer sleeve 26 to accomodate the shaft 16. In FIG. 5 it will be noted that the diameter of the inner sleeve is smaller and the width of the slots is smaller; when the shaft is inserted as shown in FIG. 4 the inner sleeve expands, the slots 28 widen and the outer sleeve 26 yields.

During operation the shaft 16 oscillates in the sleeve 24 resulting in wear of both the shaft and the bearing producing particles which are collected in the retainers 40 through the slots or grooves 28. One or more of the grease retainers 40 may be filled with lubricant which will be distributed through the slots or grooves 28 as the shaft 16 oscillates.

At the instant of reversal at each end of the shaft oscillation the momentum resulting from the motion of the linkage transmission 14 and the wiper arm 22 together with the wiper blade mounted thereon produces a side thrust on the bearing sleeve 24. The resiliency and flexibility of the segmented bearing sleeve 24 and the outer sleeve 26 absorbs the shock of the reversal produced shock load or other shock loads to minimize wear on the sleeve 24 and to thereby increase bearing life.

It can thus be seen that a unique plastic bearing has been provided which yields to provide a good fit regardless of dimensional variations in the shaft and which is particularly useful for a relatively long shaft and bearing arrangement where such variations are likely to occur. The bearing also yields to absorb increased side thrust during reversal of an oscillating shaft or other shock loading to avoid excessive bearing wear. The bearing is provided with lubricant retainers as well as lubricant distributing and dust collecting grooves. The bearing can also compensate for wear to maintain a good and proper fit after substantial use.

A specific embodiment of the invention has been shown and described for the purpose of illustration but it will of course be apparent that other modifications and embodiments are possible within the scope of the invention. For example, although the bearing has been illustrated and described for use with an oscillating windshield wiper pivot shaft it will of course be understood that such a bearing is useful in other and different kinds of apparatus. It is to be understood, therefore, that the invention is not limited to the specific arrangement shown but in its broadest aspects it includes all equivalent embodiments and modifications which come within the scope of the invention.

What is claimed is:

1. A self-dimensioning bearing assembly comprising a body of synthetic plastic material having inner and outer concentric cylindrical sleeves radially spaced from each other, said inner sleeve having elongated slots to form a plurality of resilient, flexible segments, radially extending webs connecting said inner and outer sleeves and support means for said bearing wherein the outer bearing sleeve is unconstrained against radial displacement for substantially its entire length.

2. A bearing assembly according to claim 1 wherein said webs are spaced apart circumferentially, the space between adjacent webs forming lubricant retainers.

3. A bearing assembly according to claim 2 wherein said webs are disposed medially between said slots.

4. A bearing assembly according to claim 1 supporting an oscillatable shaft wherein said inner sleeve and said shaft are dimensioned to provide an interference fit, said segments being yieldable to accomodate said shaft in said inner sleeve in a running fit relationship.

5. A bearing assembly according to claim 1 wherein said outer sleeve is resilient and flexible to thereby yield in response to radial forces applied to said segments effecting flexing of said segments.

6. A bearing assembly according to claim 1 wherein said support means comprises a mounting bracket and wherein the entire bearing, for substantially its entire length, protrudes from said mounting bracket.

* * * * *